United States Patent

Barron et al.

[15] 3,701,889

[45] Oct. 31, 1972

[54] VARIABLE-STRUCTURE AUTOMATIC CONTROL SYSTEM

[72] Inventors: Roger L. Barron, Burke; Dixon Cleveland, McLean, both of Va.

[73] Assignee: Adaptronics, Inc., McLean, Va.

[22] Filed: June 25, 1970

[21] Appl. No.: 49,768

[52] U.S. Cl. ............................235/151.1, 318/561
[51] Int. Cl. .......................G05b 17/02, G05b 13/02
[58] Field of Search ..340/172.5; 318/561; 235/150.1

[56] References Cited

UNITED STATES PATENTS 3,225,179   12/1965   Chestnut et al............235/151

OTHER PUBLICATIONS

" A Nonlinear Filter for Independent Gain and Phase (With Applications)" by W. C. Foster et al., Journal of Basic Engineering, June 1966, pp. 45– 462 Ta 1 J55
" Sef-Organizing Control" by Barron, Control Engineering February 1968 pp. 70– 74
" Self-Organizing Control: The Next Generation of Controllers" Baron, Control Engineering, March 1968, pp. 69– 74
" Nonlinear Control System Theory" by Kuba Computer Control Systems Technology University of California Engineering Extension Series VTJ 213 L47 (pp. 278– 281) McGraw-Hill
" Nonlinear Design Improve Analog 3–Mode Controller" Zoss et al. Instrumentation Technology Feb. 1969, p. 54– 57 TA 16512

*Primary Examiner*—Eugene G. Botz
*Attorney*—Jay M. Cantor

[57] ABSTRACT

This disclosure relates to a variable-structure automatic control system of improved design wherein a measure of the instantaneous distance between the actual system operating point in a phase space, defined in terms of control error and its derivatives, and the desired equilibrium point in said space is determined and employed to adjust the controller gain.

18 Claims, 13 Drawing Figures

VARIABLE-STRUCTURE AUTOMATIC CONTROL SYSTEM

This invention relates to a variable-structure automatic control system and, more specifically, to a variable-structure automatic control system in which a measure of instantaneous distance between desired equilibrium conditions and the actual operating state in phase space is determined, this measure being used to adjust control system forward loop gain in proportion thereto.

The most advanced known illustrations of prior art variable-structure automatic control systems are provided in the publication of S. V. Yemelyanov entitled Automatic Regulating Systems with Variable Structure (SYSTYEMI AVTOMATICHESKOVO OOPRAVLENIYA S PEREMENNOI STROOCTOOROI), "NAUKA" Publishing Company, Moscow, U.S.S.R., 1967 and B. N. Petrov and S. V. Yemelyanov (editors) entitled Systems with Variable Structure and Their Application to Problems in Automatic Flight (SYSTYEMI S PEREMENNOI STROOCTOOROI EE ICH PRIMENENIYE V ZADACHACH AVTOMATIZATSII POLYETA), "NAUKA" Publishing Company, Moscow, U.S.S.R., 1968 . The above noted prior art incorporates means for changing the structure of the control law according to the instantaneous system state in its phase space. Specifically, the above noted prior art determines control signal amplitude and polarity as functions of the distance between the system operating point in the phase space and at least one switching line, curve, or hypersurface in said space. The disadvantage of these prior art systems is that they require more time than necessary during the transient response to a disturbance or input change and steady-state operation is characterized by an auto-oscillation (or limit cycle) rather than the desired quiescent behavior of the system during steady-state conditions.

In accordance with the present invention, the above disadvantages are overcome by a system which is capable of distinguishing between transient and steady state operation of the system and changing the control law accordingly. Briefly, this is accomplished in part by determining control signal amplitude as a function of the distance between the operating point in phase space and the desired equilibrium point, (i.e., the point for which error and its derivatives are equal to zero) and in part by determining control signal amplitude and polarity (as in prior art systems) as functions of the distance between the operating point and at least one switching line, curve, or hypersurface. Thus, for large error and/or error rate(s), the controller employs maximum gain and therefore actuates the object of control or plant with maximum authority in the direction which acts to reduce the aforementioned distance. At such a time as this distance is decreased to a sufficiently small level that the controller gain, established in proportion to said distance, begins to diminish, the control system has entered its terminal transient phase of operation. In this phase, gain is progressively reduced as the system approaches the desired equilibrium point, so that when this point is reached, the controller output will have become quiescent, that is to say, this output signal will be a constant. Also, because restoring forces or their equivalent in the plant may require a non-zero steady-state actuation to maintain the condition of zero error, the present invention incorporates means for generating a steady-state actuation level exactly sufficient to maintain the desired condition. This means comprises a time integral signal added to the nominal output of the controller, the argument of said time integral being a function, generally nonlinear, of the nominal controller output, which has the effect of producing a positive offset or bias in the nominal output when the average of said output is positive during the terminal transient phase and vice versa when negative. This integral signal increases in magnitude and with appropriate polarity until the controller output attains an average value of zero, at which time the integral becomes constant, remaining thus until some subsequent disturbance of the system occurs.

It is therefore an object of this invention to provide a control or regulating system capable of minimizing actuator activity.

It is a further object of this invention to provide a control system which provides an essentially constant actuator control signal during steady-state conditions of small error and small error rate.

It is a still further object of this invention to provide a control system capable of employing maximum gain under transient conditions of operation so as to minimize response time and system sensitivity to plant and disturbance changes.

The above objects and still further objects of the invention will immediately become apparent to those skilled in the art from the following description of preferred embodiments of the invention which are provided by way of example and not by way of limitation; wherein.

Figure 2:
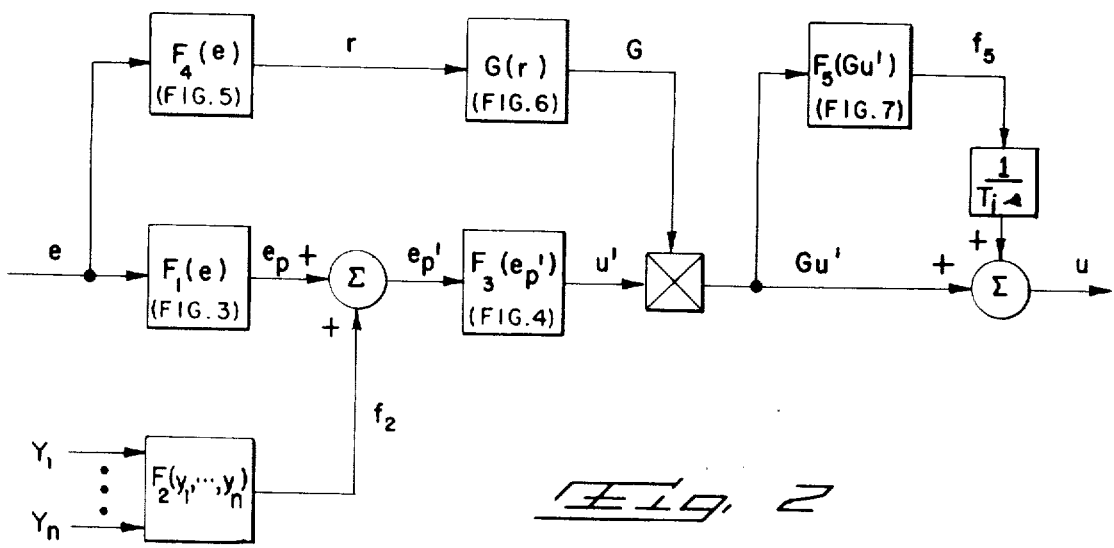
FIG. 2 is a block diagram of the variable-structure controller in accordance with the present invention.
Figure 3A:
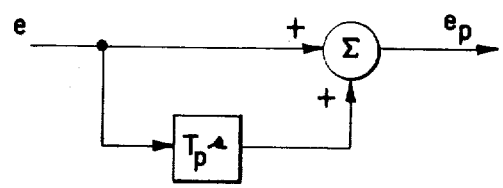
Figure 3B:
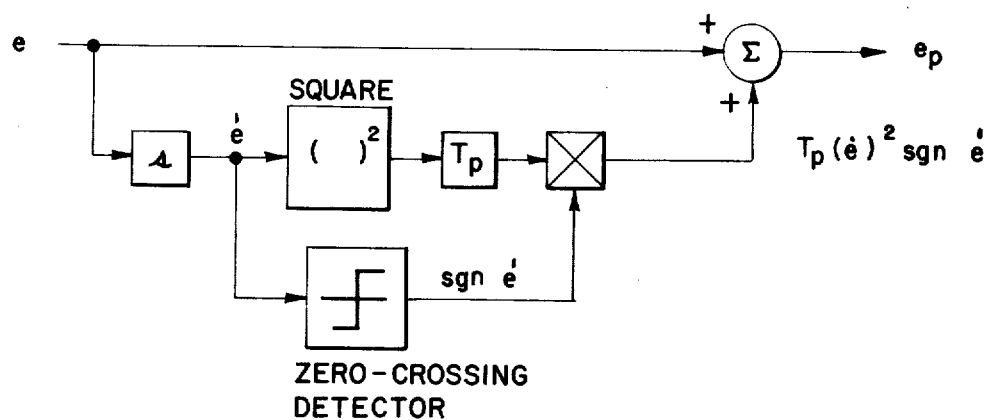
Figure 4A:
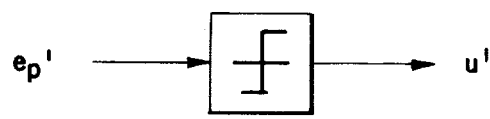
Figure 4B:
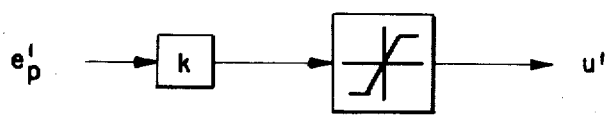
Figure 4C:
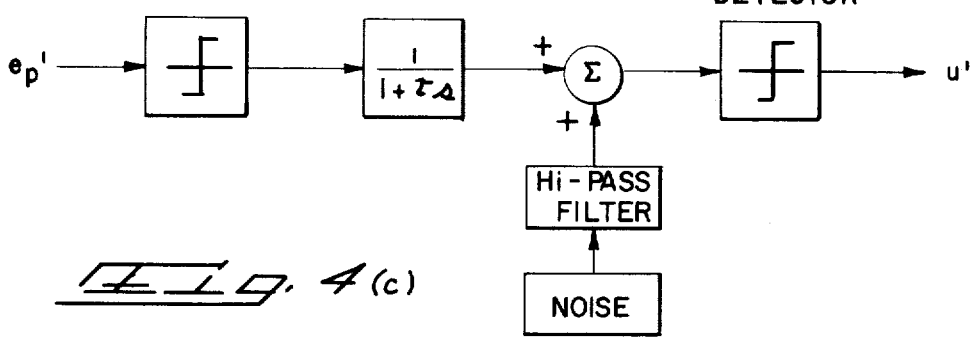
Figure 5:
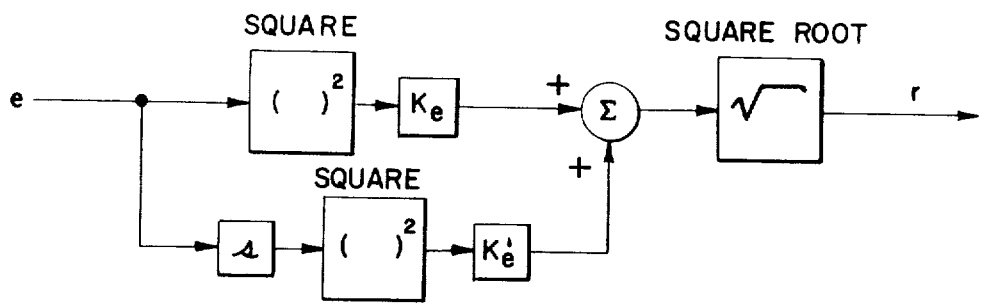
Figure 5:
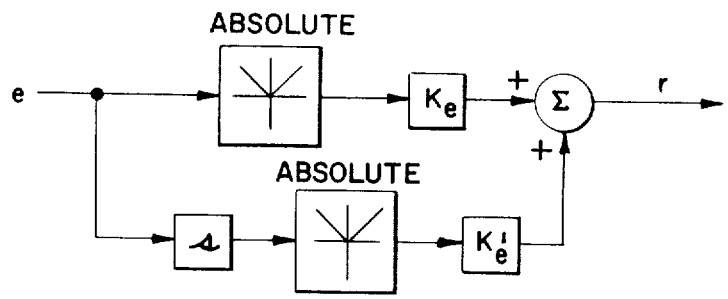
Figure 6A:
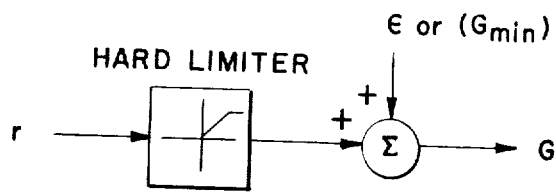
Figure 6B:
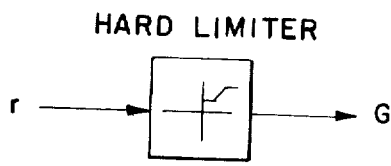
Figure 7A:
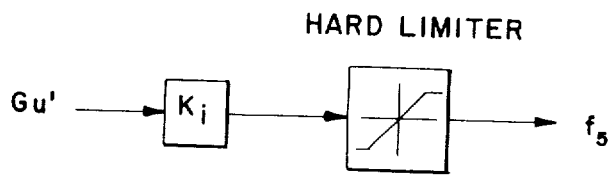

FIG. 3(a) and 3(b) are block diagrams of preferred embodiments of the function $F_1(e)$ shown in FIG. 2;

FIGS. 4(a), 4(b), and 4(c) are block diagrams of preferred embodiments of the function $F_3(e'_p)$ shown in FIG. 2;

FIGS. 5(a) and 5(b) are block diagrams of preferred embodiments of the function $F_4(e)$ shown in FIG.2;

FIGS. 6(a) and 6(b) are block diagrams of preferred embodiments of the function $G(r)$ shown in FIG. 2; and FIGS. 7(i a) and 7(b) are block diagrams of preferred embodiments of the function $F_5(Gu')$ shown in FIG. 2.

Figure 1:
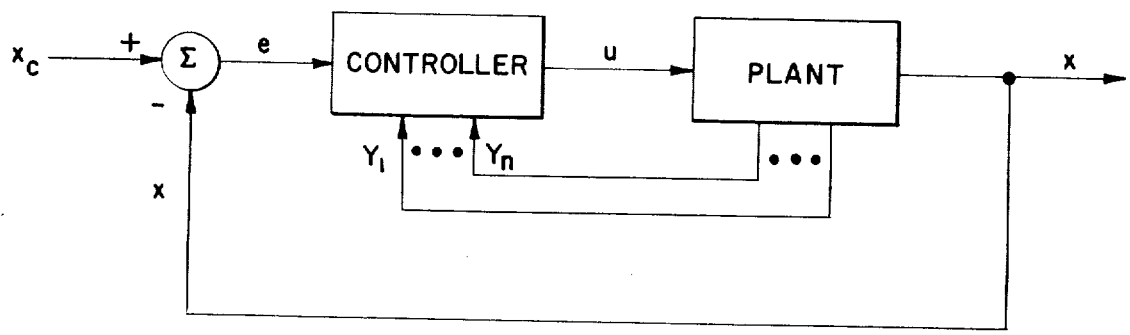
FIG. 1 is a block diagram of an automatic control system.

Referring first to FIG. 1, there is shown a control loop block diagram including the automatic controller and the plant to be controlled. The plant variable to be controlled is $x$, its commanded value $x_c$ and the resulting system error is defined by $$e = x_c - x \quad (1)$$

The purpose of the controller is to drive error to zero by manipulation of the control signal u which is the input to the plant actuator (assumed to be part of the plant). To facilitate controller prediction of error, intermediate plant variables $y_1 \ldots y_n$, in addition to $e$, may be fed into the controller.

Referring next to FIG. 2, there is shown a block diagram of the variable-structure automatic controller in accordance with the present invention. This controller functions as follows:

a. The error signal $e$ is operated upon by a predictor or lead filter, $F_1(e)$, to produce a predicted error, $e_p$.

b. $y_1 \ldots y_n$ are filtered by function $F_2 (y_1 \ldots y_n)$ to provide additional information for prediction in the form of the signal $f_2$. $f_2$ may be added to $e_p$ to form a more refined predicted error $e_p'$.

c. $e_p'$ is shaped by the function $F_3 (e_p')$ into the fundamental control signal $u'$.

d. The distance $r$ (in the phase volume) between the instantaneous operating point of the system and the desired equilibrium point is calculated by the function $F_4 (e)$ operating upon $e$.

e. The controller gain, $G$, is determined as a function of $r$ by means of the operator $G(r)$.

f. The signal $u'$ is multiplied by the gain $G$ to form $Gu'$.

g. $Gu'$ is shaped by the function $F_5 (Gu')$ to form $f_5$ which is integrated to yield a "reset" or "integral" control term, $u_i$.

h. $Gu'$ and $u_i$ are summed to form the total control signal $u$.

Preferred embodiments of the functions $F_1$, $F_2$, $F_3$, $F_4$, $G$, and $F_5$ will now be explained.

The form of the system transient response is partly dependent upon error prediction function $F_1 (e)$. If a first-order exponential response, with time constant $I_p$, is desired, $F_1(e)$ should take the form $$e_p = e + T_p \dot{e} \quad (2)$$

which is implemented as in FIG. 3(a). If a quadratic variation of $e$ with $\dot{e}$ is desired, $e_p$ takes the form $$e_p = e + T_p(\dot{e})^2 \text{sgn } \dot{e} \quad (3)$$

shown in FIG. 3(b).

High order nonlinear plants are particularly prone to limit-cycle oscillations during steady-state conditions. The auto-oscillation may often be eliminated or attenuated by judicious use of intermediate-variable feedback. These variables, herein denoted $y_1 \ldots y_n$, should contain high order derivative information. Actuator positions and rates, for example, are often useful and readily measured. These feedbacks are incorporated into the controller via $F_2 (y_1 \ldots y_n)$. To keep steady-state information from offsetting the control action, the function $F_2 (y_1 \ldots y_n)$ should be of a high-pass nature. As an example, if $y$ is the position of an actuator, one may use $$F_2 = (Ks/s+\omega) y \quad (4)$$

where the polarity of $K$ depends upon the polarity of the relationship between $y$ and derivatives of $x$.

The $F_3 (e_p')$ shaping of $e_p'$ for the formation of $u'$ can be done simply by detecting the sign of $e_p'$, as shown in FIG. 4(a). The amplitude of the signal $Gu'$ is then $G$ and its sign is the sign of $e_p'$, provided $G > 0$. Because a change in the sign of $e_p'$ results in a step change of $u'$ (and thus of $u$) when using the embodiment shown in FIG. 4(a), and because sharp step changes may place undue strain on elements in the plant, a finite-gain hard limiter, implemented as shown in FIG. 4(b), may be used to reduce the severity of the switching action. A statistical decision device, as fully disclosed in application Ser. No. 785,958 of Roger L. Barron filed Dec. 23, 1968, and as shown herein in FIG. 4(c), can be used to reduce system sensitivity to plant nonlinearities and reduce limit-cycle oscillations.

The distance in phase volume between the instantaneous operating point and the desired equilibrium point is defined for an $m$ + first order plant by $$r = \left| [K_e(e)^2 + K_{\dot{e}}(\dot{e})^2 + \ldots + K_e^m \left(\frac{m}{e}\right)^2 ]^{1/2} \right| \quad (5)$$

where $K_e$, $K_{\dot{e}} \ldots K_e^m$ are non-negative. ($\frac{m}{e}$ is defined as the $m^{th}$ derivative of $e$.) For a second-order plant the function $F_5 (Gu')$ is implemented as shown in FIG. 5(a). Since the square root of the sum of the squares is sometimes uneconomical to construct in hardware, $r$ can be approximated by a sum of absolutes, viz.

$$r = K_e|e|, + K_{\dot{e}}|\dot{e}| + \ldots + K_e^m \left|\frac{m}{e}\right| \quad (6)$$

as shown in FIG. 5(b) for a second-order plant. Note that the distance $r$ is always positive.

The gain $G$ is proportional to $r$, but several refinements are often desireable in practice. A limit on gain can be imposed to prevent actuator overdrive. Also, a small minimum gain, $\epsilon$ or $G_{min}$, may be advantageous during steady-state control. These shaping characteristics may be implemented as shown in FIGS. 6(a) and 6(b).

Figure 7B:
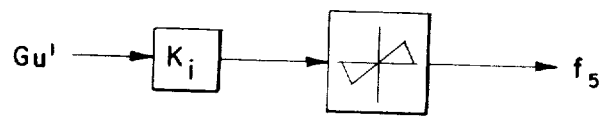

The purpose of the integral (resent) signal, $u_i$, is to eliminate steady-state errors by providing means to achieve a non-zero $u$ when $e$ is zero. If it were not for $u_i$, a non-zero value of error would be necessary to maintain a non-zero $u$. Since integral control tends to introduce degraded transient response or system instability, the function $F_5$ ($Gu'$) is employed. $Gu'$ is amplified and hard limited such that $u_i$ will not vary radically during transients, when $Gu'$ is large, because the integration time constant, $T_i$, is large relative to $K_i$. $u_i$ can still eliminate errors rapidly when the operating point is near its steady-state equilibrium and $Gu'$ is small. The $F_5$ ($Gu'$) function is shown in FIG. 7 (a). An alternative embodiment, shown in FIG. 7(b), produces no input to the integrator when $Gu'$ is large.

Though the invention has been described with respect to specific preferred embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. In an automatic controller for a controlled plant having an input command, a feedback signal indicative of the measured state of the controlled plant, combining means by which said input command and said feedback signal produce a signal indicative of controlled plant response error, and actuation means by which the output of the automatic controller is connected to and actuates said plant, a variable-structure controller which comprises first means to determine the distance in a phase space of said control error and at least one of its derivatives from the instantaneous system operating point and the desired final equilibrium point and second means responsive to said determination of said distance for altering the signal to said actuation means.

2. In an automatic controller as set forth in claim 1, said controller having at least one switching function in said phase space, third means for determining a function of the distance in said phase space from the instantaneous system operating point to at least one of said switching functions and fourth means responsive to said third means for determining the distance to said switching functions for altering the signal to said actuation means in conjunction with said second means.

3. In an automatic controller as set forth in claim 1, wherein said plant, including said actuation means, includes fifth means for measuring intermediate response variables indicative of the state of said plant, and sixth means responsive to said fifth means for altering the signal to said actuation means in conjunction with said second means.

4. In an automatic controller as set forth in claim 2, wherein said plant, including said actuation means, includes fifth means for measuring intermediate response variables indicative of the state of said plant, and sixth means responsive to said fifth means for altering the signal to said actuation means in conjunction with said second and fourth means.

5. In an automatic controller as set forth in claim 1, said controller having at least one phase space switching function associated therewith, third means for determining a function of the distance in said phase space from the instantaneous system operating point to at least one of said switching functions and fourth means responsive to said third means for determining the distance to said switching functions for altering the signal to said actuation means in conjunction with said second means.

6. In an automatic controller as set forth in claim 5, wherein said plant, including said actuation means, includes fifth means for measuring intermediate response variables indicative of the state of said plant, and sixth means responsive to said fifth means for altering the signal to said actuation means in conjunction with said second and fourth means.

7. An automatic controller as set forth in claim 1 wherein said first means includes a seventh squaring means for squaring said signal indicative of plant response error, eighth means for squaring the derivative of said signal indicative of plant response error, ninth means for combining the outputs of said seventh and eighth means, and tenth means for taking the square root of the output of said ninth means.

8. An automatic controlled as set forth in claim 2, wherein said first means includes a seventh squaring means for squaring said signal indicative of plant response error, eighth means for squaring the derivatives of said signal indicative of plant response error, ninth means for combining the outputs of said seventh and eighth means, and tenth means for taking the square root of the output of said ninth means.

9. An automatic controller as set forth in claim 3 wherein said first means includes a seventh squaring means for squaring said signal indicative of plant response error, eighth means for squaring the derivative of said signal indicative of plant response error, ninth means for combining the outputs of said seventh and eighth means, and tenth means for taking the square root of the output of said ninth means.

10. An automatic controller as set forth in claim 4 wherein said first means includes a seventh squaring means for squaring said signal indicative of plant response error, eighth means for squaring the derivative of said signal indicative of plant response error, ninth means for combining the outputs of said seventh and eighth means, and tenth means for taking the square root of the output of said ninth means.

11. An automatic controller as set forth in claim 5 wherein said first means includes a seventh squaring means for squaring said signal indicative of plant response error, eighth means for squaring the derivative of said signal indicative of plant response error, ninth means for combining the outputs of said seventh and eighth means, and tenth means for taking the square root of the output of said ninth means.

12. An automatic controller as set forth in claim 6 wherein said first means includes a seventh squaring means for squaring said signal indicative of plant response error, eighth means for squaring the derivative of said signal indicative of plant response error, ninth means for combining the outputs of said seventh and eighth means, and tenth means for taking the square root of the output of said ninth means.

13. An automatic controller as set forth in claim 1 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

14. An automatic controller as set forth in claim 2 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

15. An automatic controller as set forth in claim 3 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

16. An automatic controller as set forth in claim 4 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

17. An automatic controller as set forth in claim 5 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

18. An automatic controller as set forth in claim 6 wherein said first means includes an eleventh means for providing the absolute value of said signal indicative of plant response error, twelfth means for providing the absolute value of the derivative of said signal indicative of plant response error and thirteenth means for combining the outputs of said eleventh and twelfth means.

* * * * *